United States Patent Office 3,687,620
Patented Aug. 29, 1972

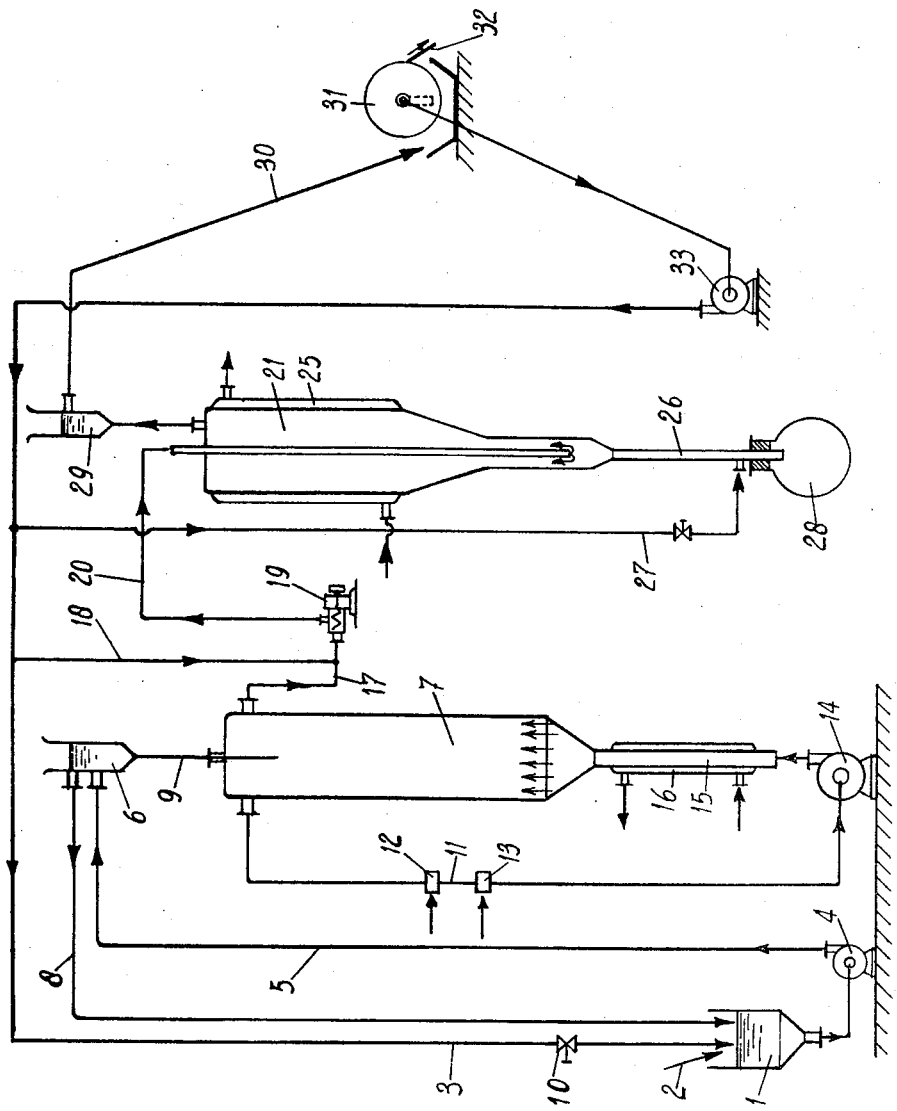

3,687,620
MANUFACTURE OF AMMONIUM SULFATE FROM GYPSUM
Johan F. Witte, 156 Nieuwendammerdijk, Amsterdam, Netherlands, and Jacobus J. de Wit, 74 Populierenlaan, Amstelveen, Netherlands
Continuation-in-part of application Ser. No. 708,849, Feb. 28, 1968. This application Sept. 18, 1970, Ser. No. 73,339
Int. Cl. C01c 1/24; C01f 11/18
U.S. Cl. 423—548
4 Claims

ABSTRACT OF THE DISCLOSURE

Ammonium sulfate is manufactured from gypsum by a continuous process in which an aqueous flow of material is continously recycled along a predetermined closed circuit defined by a conduit and a wider vessel connected in series. A fresh aqueous gypsum slurry comprising a dispersion of finely divided gypsum in an ammonium sulfate solution is continuously introduced into the flowing material and followed by continuous injection of carbon dioxide gas and gaseous ammonia which react with the gypsum to form calcium carbonate and ammonium sulfate. Any reaction heat is absorbed by a cooler to maintain the temperature between desired limits. Then, a retardation of material flow is caused by passing the material through the vessel of the circuit and so allowing crystals of calcium carbonate to grow under controlled conditions. After completion of crystal growth, a portion of the flowing material is continuously withdrawn from its circuit and the solid calcium carbonate is removed from this portion in order to obtain an ammonium sulfate solution which may be used as such or worked up to solid ammonium carbonate.

RELATED CASE

This application is a continuation-in-part of our co-pending application Ser. No. 708,849, filed Feb. 28, 1968, and now abandoned.

This invention relates to the manufacture of ammonium sulfate from gypsum.

In the fertilizer industry, gypsum or calcium sulfate is often obtained as a by-product from the digestion or phosphate rock in a wet process. Since gypsum itself has no fertilizing properties, this by-product is frequently converted to ammonium sulfate which has more value as a fertilizer. Normally, the conversion of gypsum to ammonium sulfate is carried out by slurrying gypsum with water, adding an aqueous ammonium carbonate solution, stirring the resulting mixture for a period sufficient to convert substantially all of the gypsum to solid calcium carbonate and dissolved ammonium sulfate and removing the solid calcium carbonate from the slurry by filtration of centrifugation. The resulting filtrate is an aqueous solution of ammonium sulfate which may be used as such or worked up to recover solid ammonium sulfate. Disadvantages of this process are that it is discontinuous, and that it takes a rather long reaction time, whilst many reaction vessels and a high amount of mechanical stirring energy are required.

There has also been proposed a continuous process in which a flow of material is recycled along a closed circuit, e.g. a circuit formed by a storage tank and a circulatory conduit of considerable length, and in which a fresh aqueous gypsum slurry, as well as gaseous carbon dioxide and gaseous ammonia are continuously introduced at fixed points of the circuit, whilst part of the flowing material is withdrawn from the circuit at another fixed point downstream from the point of gas injection. The carbon dioxide and ammonia will react with freshly added gypsum in the flowing mass and will convert it to solid calcium carbonate and ammonium sulfate. Solid calcium carbonate is removed from the withdrawn part of the flowing material by filtering and washing and the remaining filtrate is again a solution of ammonium sulfate which may be used as such or worked up to solid ammonium sulfate. This process has many advantages above the more conventional method but nevertheless, it could still be improved in many aspects. Thus, the solid calcium carbonate is frequently obtained in an impure state due to occlusion of ammonium sulfate and this ammonium sulfate cannot be sufficiently washed out since high amounts of washing water would dilute the remaining filtrate of ammonium sulfate solution too much. On the other hand, the remaining filtrate still comprises some calcium carbonate due to incomplete and inhomogeneous crystallization of the latter compound and this impurity contaminates the desired end product. As a result, the overall efficiency of using gaseous ammonia used in this process is far from optimal.

The invention has for its object to prevent the disadvantages of the known continuous process.

Another object is to provide a continuous process of manufacturing ammonium sulfate from gypsum, wherein the crystals of solid calcium carbonate are obtained in higher yield and higher purity, at the same time resulting in an ammonium sulfate solution of higher yield and purity.

A further object is to provide a continuous process for the manufacture of ammonium sulfate from gypsum, wherein more washing water may be used for washing out the resulting by-product calcium carbonate.

A still further object is to provide a continuous process for the manufacture of ammonium carbonate from gypsum wherein the overall efficiency of gaseous ammonia used in the system is improved.

The above and other objects are accomplished by the invention which provides a continuous process of manufacturing ammonium sulfate from gypsum. In a preferred embodiment of this process, an aqueous flow of material, comprising an ammonium sulfate solution and other solid and dissolved constituents, is recycled along a pre-determined closed circuit formed by a vessel and a conduit connected in series. The vessel has a wider size than the conduit so as to prevent an extreme length of the whole circuit and is passed by the flowing material in upward direction. A fresh aqueous dispersion or slurry of gypsum in ammonium sulfate solution is continuously introduced into the flow of material and is followed, at closely spaced points of the circuit, by continuous injection of carbon dioxide gas and gaseous ammonia. The injected gases react immediately with freshly added gypsum to form calcium carbonate which crystallizes and ammonium sulfate which remains dissolved. Any reaction heat is absorbed by a cooler so as to maintain the temperature between desired limits and the flow rate of the reaction mixture is retarded by passing the mixture through the vessel of the conversion circuit, so as to allow an undisturbed crystal growth of calcium carbonate under controlled conditions. When the flow of material has reached the top of the vessel, crystal growth of calcium carbonate has been completed and a portion of the flowing material is continuously withdrawn from the circuit in order to be separated into solid calcium carbonate and a remaining ammonium sulfate solution. An important feature in this process is the presence of ammonium sulfate already in the freshly added gypsum slurry. This added ammonium sulfate will help in forcing calcium sulfate out of solution and thus, brings with it an improvement of crystal growth. Another feature is the absorption of reaction heat by a cooler so as to maintain the temperature of the flowing material between certain limits. Thanks to this heat absorption, crystal growth of calcium carbonate can take place at a controlled temperature and crystal growth is more homogeneous. A third feature is the retardation of flow rate by passing the flowing material through a vessel of wider diameter. This permits a better controlled and more homogeneous crystal growth of calcium carbonate. The total result is that the crystals may be filtered better and that they comprise less occlusions so that the remaining ammonium sulfate solution is obtained in higher yield and purity. Nevertheless, more washing water may be used for washing any filtered calcium carbonate since the filtrate is normally highly concentrated due to the addition of ammonium sulfate to the fresh gypsum slurry.

The invention will be further described with reference to the accompanying drawing which shows a diagrammatical view of an apparatus for carrying out the invented process.

The apparatus as shown comprises several parts which serve for preparing and recycling a gypsum slurry, converting the gypsum from the slurry to calcium carbonate and ammonium sulfate, crystallizing and recovering an excess of ammonium sulfate, and removing solid calcium carbonate from a remaining ammonium sulfate solution.

In the first part of the apparatus, a gypsum slurry is prepared in mixing vessel 1 by continuously supplying gypsum in finely divided solid state to this vessel and intimately mixing it therein with a solution of ammonium sulfate continuously supplied by conduit 3. The concentration of the ammonium sulfate solution is about 42–46% by weight and the mixing ratio between gypsum and ammonium sulfate solution is about 1:3. The amount of solution supplied to vessel 1 by conduit 3 may be adjusted by means of a control valve 10 in that conduit.

The gypsum slurry prepared in vessel 1 is withdrawn from that vessel by a pump 4 and passed through conduit 5 to a receptacle 6 which serves as a feeding device for a gypsum conversion cycle in the next part of the apparatus. The amount of slurry passed to receptacle 6 by pump 4 is several times greater than that required for feeding the conversion cycle and the excess of slurry flows over into conduit 8 and is returned by that conduit to mixing vessel 1. Thanks to this overflow, a certain amount of slurry is continuously recycled through a circuit comprising a vessel 1, conduit 5, receptacle 6 and conduit 8. This recycling step prevents the gypsum from settling in receptacle 6 and ensures an intimate mixing operation with freshly supplied gypsum and ammonium sulfate solution in mixing vessel 1.

The next part of the apparatus comprises a conversion cycle or circuit for continuous conversion of gypsum to calcium carbonate and ammonium sulfate. This conversion circuit is formed by a vessel 7 and a circulatory conduit 11, connected in series. The vessel is vertically positioned and has a diameter of about 5 times the diameter of conduit 11, whilst its height is about 5/8 of the total circuit and its capacity is about 10/11 of the total circuit. The purpose of this vessel is to prevent an extreme length of the conversion circuit and moreover, to provide for a retardation of flow of any material circulating in the circuit.

During operation, a material comprising an ammonium sulfate solution and other solid or dissolved constituents is contained in the described conversion circuit and is recycled therein by means of a pump 14 located in conduit 11. Circulatory flow is upward in vessel 7 and downward in conduit 11. The pump 14 has such a capacity that any solid constituents in the flowing material will circulate together with the ammonium sulfate solution and will be maintained in suspension. This means that rather high pumping velocities may be used.

A narrow pipe 9 for continuously introducing fresh gypsum slurry from receptacle 6 is located at the upper side of vessel 7. This pipe ensures that the fresh slurry as introduced is immediately and intimately mixed with the circulating material and entrained therewith to conduit 11. The amount of material introduced per time unit is in general 0.1 to 10% by weight and preferably 1% by weight of the amount of flowing material passing per time unit from vessel 7 to conduit 11. This ratio may be obtained by adjusting the pumping velocity of the material flowing within the conversion cycle at a high value.

Conduit 11 has means 12 and 13 for continuous injection of carbon dioxide gas and gaseous ammonia, respectively, into the flowing material. Both means 12 and 13 may be constructed as mixing chambers so as to ensure that the gases are injected in finely divided form. The gases react immediately with freshly added gypsum in the flowing material to form calcium carbonate and ammonium sulfate and it is preferred to have the injection means 12, 13 closely spaced, e.g. at a distance of about 16 inches, so as to cause a rapid reaction.

A cooler 15, having a jacket 16 through which cooling water may pass, is provided in conduit 11 for absorbing any reaction heat produced during reaction of carbon dioxide and ammonia with fresh gypsum. This cooler is shown here situated between pump 14 and vessel 7 but it may be located in general at any point between gas injection means 12, 13 and vessel 7, since the reaction will be completed already before the flowing material has reached vessel 7. Thanks to this cooler, the temperature of the flowing material within the conversion cycle may be controlled and maintained within desired limits.

The flowing material entering vessel 7 at its bottom comprises an ammonium sulfate solution together with a freshly formed portion of ammonium sulfate and a freshly formed portion of calcium carbonate. The calcium carbonate has a marked tendency to crystallize and the solution is supersaturated with it, whilst small crystals are already present in the material. During upward flow through vessel 7, the flow rate is retarded, due to the increased diameter of the vessel in comparison with that of conduit 11 and there is offered a fine opportunity for calcium carbonate crystals to grow, thus gradually removing any supersaturation in the flowing material. Flow conditions in vessel 7 are well controlled thanks to the fact that the material is rising with retarded but otherwise constant rate. As a result, the calcium carbonate crystals have grown to their optimum size and any supersaturation has been removed when the flowing material arrives at the top of vessel 7.

A conduit 17 is connected to the upper side of vessel 7 for continuous withdrawal of a portion of flowing material from the circuit just before introduction of a fresh gypsum slurry. This withdrawn portion passes to a next part of the apparatus for further crystallization and separation. The remaining portion of material takes up an amount of fresh gypsum slurry and enters conduit 11 for being subjected to a new conversion cycle. It will be noted that this material still comprises calcium carbonate crystals which may promote crystal formation of newly formed calcium carbonate during the new conversion cycle.

It will further be noted that crystal growth of calcium carbonate in vessel 7 is promoted by the presence of large amounts of ammonium sulfate derived from different sources, viz. recycled ammonium sulfate, freshly added ammonium sulfate from gypsum slurry and ammonium sulfate formed during the reaction. This ammonium sulfate forces the calcium carbonate out of solution. Further, the crystal growth is promoted by temperature control in cooler 15 and by the retardation of flow rate in vessel 7 due to the wider diameter of this vessel.

The total residence time of the material flowing in the conversion circuit is defined by the capacity of the circuit and by the amount of freshly introduced material per time unit. This residence time will show little or no variations for different portions of the flowing material and will in general be from 1 to 2 hours. 90% of this period is passed in vessel 7.

The portion of crystal-bearing material withdrawn from vessel 7 and having a temperature of about 65° C., is continuously passed through conduit 17 where it is mixed with ammoniate sulfate solution from a conduit 18. The resulting mixture is passed to a crystallizer 21 by means of pump 19 and conduit 20. Pump 19 is adjustable in capacity so that the mixing ratio of the crystal-bearing material portion and the ammonium sulfate solution may be adjusted at will.

The mixture flowing from conduit 20 enters crystallizer 21 at a temperature of about 40–45° C. and is cooled therein to about 20–25° C. so as to cause crystallization of an excess of ammonium sulfate. To this end, crystallizer 21 is provided with a cooling jacket 25. The ammonium sulfate crystals as formed leave crystallizer 21 through washing pipe 26 wherein these crystals are washed by ammonium sulfate solution supplied by conduit 27. The washed ammonium sulfate crystals are received in a tank 28. A mixture of calcium carbonate crystals and ammonium sulfate solution is continuously leaving crystallizer 21 at its top part and is received in an overflow vessel 29, from which it flows through a conduit 30 to a separating device.

Tests have shown that the amount of ammonium sulfate solution introduced into crystallizer 21 by conduit 27 should be at least three times the amount of mixture passed through conduit 17 to crystallizer 21 in order to obtain an efficient separation of crystals.

The mixture of calcium carbonate crystals and ammonium sulfate solution leaving vessel 29 flows through a conduit 30 to a separating device, e.g. a drum filter 31. In this filter 31, the calcium carbonate is separated by filtration and is scraped off at 32. The resulting filtrate is a solution of ammonium sulfate and is continuously passed into conduit 3 and branches 18, 27 by means of pump 33 for recycling it to several parts of the apparatus such as to mixing vessel 1, to withdrawal conduit 17 and to washing pipe 26.

When using the aforesaid apparatus, a conversion degree of at least about 95% may be reached for short residence time of the freshly added gypsum material in the conversion circuit. However, the apparatus as shown is suitable only for treating dry, calcined gypsum or anhydrite. Should the starting material be humid gypsum in the form directly resulting from a wet phosphate rock digestion process, then an evaporator should be provided adjacent to filter 31 in order to concentrate the ammonium sulfate solution obtained from that filter before recycling it to conduits 3, 18, and 27.

A sediment tank may be inserted in conduit 30 for relieving filter 31.

If it is not required to crystallize ammonium sulfate in the apparatus, crystallizer 21 is omitted and the mixture in conduit 20 is pumped directly to filter 31, whilst conduit 27 serves as a means for withdrawing part of the resulting ammonium sulfate solution from the apparatus as an end product. Care should be taken then to ensure that no ammonium sulfate crystals are formed at undesired places of the apparatus and this may be accomplished, if necessary, by starting with humid gypsum and supplying additional water to vessel 1. Should nevertheless some ammonium sulfate crystals be formed in reaction vessel 7, then these crystals may be dissolved by adding fresh water to vessel 7.

The following example further illustrates the process of the invention as carried out with the apparatus of the drawing. For purposes of illustration, dry calcined gypsum has been chosen as a starting material therein but it will be apparent that humid gypsum in a form resulting from a wet phosphate rock digestion process may be used in this process as well and with similar results.

Example

A gypsum slurry is prepared in vessel 1 by supplying about 27.5 kg./h. of finely divided dry calcined gypsum (comprising about 25.8 kg./h. of $CaSO_4$ and 1.7 kg./h. of crystal water) to this vessel and mixing it therein with about 140.5 kg./h. of a 42% ammonium sulfate solution coming from conduit 3. The slurry as prepared is circulated through conduit 5, receptacle 6 and conduit 8 by means of a pump 4 which has a pumping capacity of 2 m.$^3$ slurry per hour.

About 168 kg./h. of this gypsum slurry is introduced through pipe 9 into the conversion circuit formed by vessel 7 and conduit 11 where it is circulated anti-clockwise by pump 14 which has a pumping capacity of about 21 m.$^3$ material per hour. Conduit 11 has a diameter of about 7 cm. and a total length of about 570 cm., the flow rate of circulating material therein being about 150 cm./sec. About 6.4 kg./h. of gaseous ammonia and 8.4 kg./h. of gaseous carbon dioxide are introduced into this conduit at 12 and 13 respectively and react immediately with the freshly added gypsum circulating therein. The temperature of flowing material is maintained at about 65° C. by means of cooler 15.

Vessel 7 has a diameter of about 30 cm. and a height of about one meter. The flow rate of circulating material is retarded therein from about 150 cm./sec. to about 8 cm./sec., thus allowing an opportunity for calcium carbonate crystals to grow, the total residence time in the whole conversion circuit being one hour.

A portion of about 183 kg./h. of flowing material is withdrawn from the circuit by means of conduit 17 and is mixed therein with about 207 kg./h. of ammonium sulfate solution from conduit 18. The resulting mixture (390 kg./h.) is passed to crystallizer 21 and is cooled therein to about 20° C. in order to form crystals of ammonium sulfate. The crystals are washed with about 35.6 kg./h. of ammonium sulfate solution from conduit 27 and received in tank 28 at a rate of about 24.5 kg./h.

About 400.5 kg./h. of a mixture of calcium carbonate crystals and ammonium sulfate solution is flowing from crystallizer 21 to drum filter 31. In this filter, an amount of about 1.7 kg./h. of washing water is used. The filter cake leaving the apparatus at 32 as a by-product comprises about 18.5 kg./h. of calcium carbonate and about 0.6 kg./h. of calcium sulfate, the total amounting to 19.1 kg./h.

The filtrate from drum filter 31, having a temperature of about 20° C., is essentially a 42% ammonium sulfate solution and is recycled to several parts of the apparatus as indicated in the drawing.

It will be apparent from the foregoing that an efficient process has been provided for continuous conversion of gypsum to ammonium sulfate. Thanks to the addition of ammonium sulfate solution to the freshly added gypsum slurry, thanks to the absorption of any reaction heat by cooler 15 and thanks to the retardation of flowing rate in vessel 7, the crystal growth of calcium carbonate is highly improved, so that a better separation between calcium carbonate and useful ammonium sulfate solution is reached.

Of course, many variations to the described process will be possible without going beyond the scope of the appended claims. Such variations will be clear to those skilled in the art and will need no further explanation here.

What we claim is:
1. In a process of manufacturing ammonium sulphate from gypsum, the steps of:
    (a) continuously recycling an aqueous flow of material comprising an ammonium sulphate solution and other solid and dissolved constituents along a predetermined closed circuit;

(b) continuously introducing a fresh slurry of finely divided gypsum in an aqueous ammonium sulphate solution into said flow of material, said slurry comprising about one part by weight of finely divided gypsum for every three parts by weight of ammonium sulphate solution and said ammonium sulphate solution having a concentration of about 42 to 46% by weight;

(c) continuously injecting carbon dioxide and ammonia into the flow of material, so as to react with said freshly introduced gypsum to form calcium carbonate and ammonium sulphate;

(d) absorbing any developed reaction heat so as to control the temperature in flowing material and to ensure that said flowing material is supersaturated with calcium carbonate;

(e) retarding the flow of material by leading it upwardly in a vertical part of said circuit which has a diameter of about 5 times the diameter of any remaining portion of said circuit, a height of about $5/8$ of the total circuit and a capacity of about $10/11$ of the total circuit; so as to allow crystal growth of calcium carbonate under controlled conditions;

(f) continuously withdrawing a portion of the flow of material from its circuit after completion of crystal growth;

(g) removing solid calcium carbonate from said withdrawn portion of material in order to obtain a remaining solution of ammonium sulphate;

(h) cooling said remaining solution in order to effect crystallization of an excess of ammonium sulphate; and (i) removing solid ammonium sulphate from said solution as a desired product.

2. The process of claim 1, in which the amount of fresh gypsum slurry per time unit as introduced into the flow of material is about 1% by weight of the amount of flowing material passing per time unit through the conversion circuit.

3. The process of claim 1, in which the rate of introduction of fresh gypsum slurry and the rate of injecting gases are such that conversion of the gypsum in the withdrawn portion of the flowing material is in the order of 95%.

4. In a process of manufacturing ammonium sulphate from gypsum which includes the steps of continuously circulating an aqueous solution of ammonium sulphate in a closed path, forming a gypsum slurry and continuously introducing such slurry into the closed path, continuously introducing carbon dioxide and gaseous ammonia into said closed path at rates sufficient substantially completely to convert the introduced gypsum into calcium carbonate and ammonium sulphate, and continuously withdrawing aqueous ammonium sulphate and entrained calcium carbonate from said closed path at a rate sufficient continuously to maintain the concentration of ammonium sulphate in said closed path at less than saturation, the improvement which comprises:

(a) recovering ammonium sulphate and separating the calcium carbonate from the material withdrawn from said closed path to provide a recycle liquid which is a substantially unsaturated aqueous solution of ammonium sulphate;

(b) forming the gypsum slurry by mixing finely divided gypsum with at least a portion of said recycle liquid provided in (a);

(c) absorbing the heat of reaction due to the conversion of the introduced gypsum to ensure supersaturation with calcium carbonate;

(d) retarding the flow of said material by leading it upwardly in a vertical part of said circuit which has a diameter of about 5 times the diameter of any remaining portion of said circuit, a height of about $5/8$ of the total circuit and a capacity of about $10/11$ of the total circuit, subsequent to (c) and prior to the point of slurry introduction at a flow rate sufficiently slow and over a length sufficiently long as to allow undisturbed and homogeneous crystal growth of calcium carbonate in the aqueous ammonium sulphate solution; and (e) effecting the continuous withdrawal of aqueous ammonium sulphate and entrained calcium carbonate at the upper part of said portion defined in (d).

References Cited

UNITED STATES PATENTS

| | | | |
|---|---|---|---|
| 2,689,175 | 9/1954 | Strelzoff et al. | 23—103 X |
| 2,795,486 | 6/1957 | Pluim | 23—119 |

FOREIGN PATENTS

| | | | |
|---|---|---|---|
| 262,320 | 12/1926 | Great Britain | 23—119 |
| 327,488 | 4/1930 | Great Britain | 23—119 |

EDWARD STERN, Primary Examiner

U.S. Cl. X.R.

423—165